United States Patent [19]

Bodimer

[11] Patent Number: 4,865,185

[45] Date of Patent: * Sep. 12, 1989

[54] CRAWLER-MOUNTED CONVEYING TRAIN

[75] Inventor: Theodore B. Bodimer, Franklin, Pa.

[73] Assignee: Joy Technologies Inc., Pittsburgh, Pa.

[*] Notice: The portion of the term of this patent subsequent to Aug. 1, 2006 has been disclaimed.

[21] Appl. No.: 913,918

[22] Filed: Oct. 1, 1986

Related U.S. Application Data

[63] Continuation-in-part of Ser. No. 832,188, Feb. 24, 1986.

[51] Int. Cl.$^4$ .............................................. B65G 21/00
[52] U.S. Cl. ................................. 198/861.2; 198/303; 305/35 R; 305/39
[58] Field of Search ...................... 198/300, 303, 861.2; 299/43, 44, 45, 46, 47, 49, 50; 305/44, 57, 58 R, 35 RX, 39 X, 41, 54, 50 PC

[56] References Cited

U.S. PATENT DOCUMENTS

| | | | |
|---|---|---|---|
| 1,733,526 | 10/1929 | Coburn et al. | 305/57 |
| 2,674,364 | 4/1954 | Cartlidge | 198/303 |
| 3,361,248 | 1/1968 | Daymon | 198/303 |
| 3,701,411 | 10/1972 | McGinnis | 198/303 |
| 3,863,752 | 2/1975 | Sibley | 198/303 |
| 4,339,031 | 7/1982 | Densmore | 198/861.2 |
| 4,646,906 | 3/1987 | Wilcox, Jr. et al. | 198/303 |

FOREIGN PATENT DOCUMENTS 1373170 11/1974 United Kingdom ............. 198/861.2

Primary Examiner—Robert J. Spar
Assistant Examiner—James R. Bidwell
Attorney, Agent, or Firm—Kirkpatrick & Lockhart

[57] ABSTRACT

A self-propelled material conveying system capable of traversing a surface along an elongated path. The conveying system includes a plurality of framework members arranged in tandem on the surface to form an elongated conveyor train. A connector on each framework member cooperates with a connector on an adjacent framework member for coupling the plurality of framework members and also permitting universal-type movement between adjacent members. The framework members also include supports for a plurality of orbitally-moveable crawler chains which engage the surface. The crawler chain supports substantially the entire longitudinal extent of the train. The framework members also support an orbitally-moveable conveyor belt above the crawler chains. The conveying run of the orbitally-moveable conveyor belt operates to convey material throughout substantially the entire longitudinal extent of the conveyor train. The crawler chains can be simultaneously driven to propel the material conveying system along the elongated path. The input end of the conveying system is steerable so that each framework member follows, in series, the path delineated by the first framework member as the conveying system advances. The orbitally-moveable conveyor belt is independently driven thereby allowing conveyance of material either while the material conveying system is stationary or moving.

17 Claims, 12 Drawing Sheets

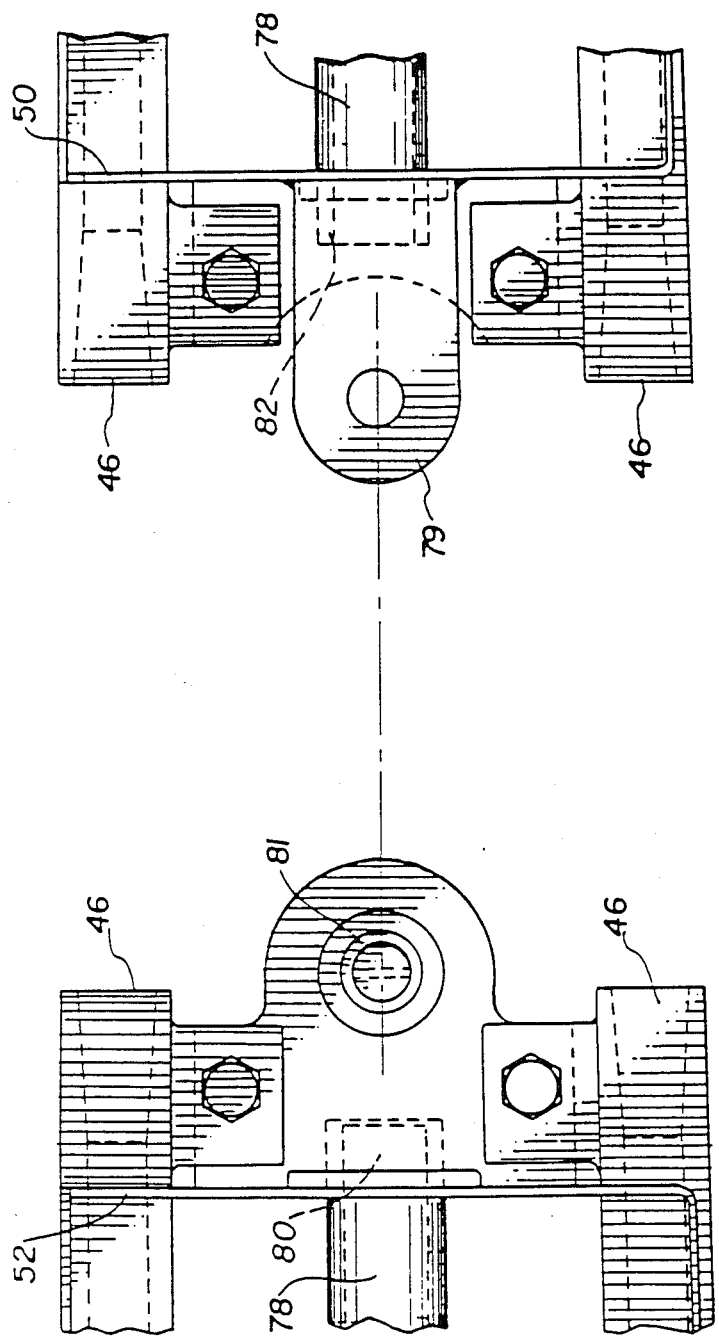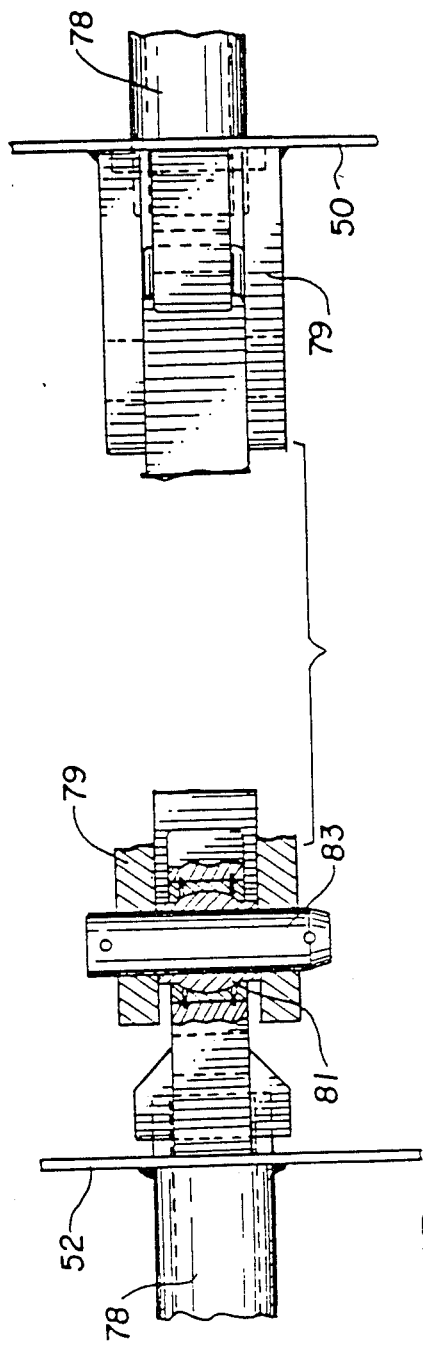
FIG. 3A
FIG. 3B

CRAWLER-MOUNTED CONVEYING TRAIN

BACKGROUND OF THE INVENTION

This application is a continuation-in-part of co-pending application Ser. No. 832,188 filed on February 24, 1986.

1. Field of the Invention

The present invention relates to conveyor systems, and more particularly, is directed to the crawler chain drive of a self-propelled articulated conveyor system adapted to be driven along the mine surface by an elongated crawler chain and which conveyor system is capable of traversing curvilinear paths.

2. Description of the Prior Art

In mining operations, especially underground mining operations, such as, coal mining or the like, conveyors or series of conveyors are used to transport the mined ore from the mine. Normally, there is a main conveyor that moves the mined material along a fixed path. The main conveyor has a terminal end at a fixed location for receiving the material being mined. In the past, shuttle cars or other short distance haulage vehicles have been used to transport the mined material from the mining machine to the fixed terminal end of the main conveyor. The use of shuttle cars and other such haulage vehicles is intermittent, time consuming, and inefficient in not providing for the continuous transport of the mined materials from the mining machine to the fixed conveyor. Thus, in more recent years there have been several developments directed toward a mobile articulated conveyor that provides for continuous transport of the discharge of a continuous miner to the main conveyor as the miner advances into the mine face and changes the direction of its forward movement. Such mobile articulated conveyors are particularly adaptable to "room and pillar" type coal mining operations wherein the mobile conveyor follows the continuous miner and changes in direction as the machine penetrates into the mine face in one room and then is backed out and set to work in the mine face of another room while roof bolts are installed in the recently mined room. The mining machine is then backed out of this second room and set to work in either the recently roof-bolted room or it may go on to still another room.

One of these more recently developed mobile articulated conveyors is shown in the Payne et al patent, U.S. Pat. No. 3,707,218, and sold under the trade designation "Serpentix". The Serpentix conveyor has an endless trough shaped, accordion-pleated belt supported on a vertebrae-like member which, in turn, is supported on the mine floor by stanchions. The stanchion supported conveyor was cumbersome and did not lend itself to frequent shifting of the conveyor path from room to room. Thus, Craggs, as shown in U.S. Pat. No. 3,920,115, suspended to Serpentix conveyor from an overhead monorail and thereby provided a flexible frame conveyor which could be attached to the surge car behind a mining machine. The conveyor could now follow the mining machine as it moved from one room to another in performing its mining operation.

Another development of such mobile articulated conveyors is disclosed in McGinnis U.S. Pat. No. 3,701,411 which shows a conveyor comprised of an endless belt supported on a train of pivotally interconnected portable cars or carriages. Each of the carriages are supported on ground engaging wheels thereby providing mobility to the conveyor. A self-propelled tractor is connected to the conveyor train to move it from one location to another. Another development along the same lines can be found in U.S. Pat. No. 3,863,752.

A later McGinnis patent, U.S. Pat. No. 4,061,223, discloses a mobile articulated conveyor suspended from an overhead monorail. Shown is a U-shaped conveyor belt carried by a plurality of individual carriage units suspended from the overhead monorail. The carriage units are fastened to one another by a resilient, flexible spline member which provides for positioning of the carriage units around vertical and horizontal curves. The conveyor belt is driven by a separate power belt and guided by guide rollers.

The Assignee of Applicant's invention has obtained U.S. Pat. No. 4,339,031 which discloses a mobile monorail suspended conveyor system. While this conveying system has shown promise in higher seams of coal and other mineral mining, there is a limit to the seam height in which one can utilize a conveyor system suspended from an overhead monorail.

United Kingdom Patent No. 1,373,170 discloses a self-propelled conveying system which can convey minerals and can move itself from one place to another after the conveying function is no longer required. As can be seen, an obvious draw back to this system is that the conveyor is not capable of continuously conveying material from the input end to the discharge end while the conveying system is being moved to another site.

Co-pending U.S. patent application Ser. No. 832,188 discloses a self-propelled conveying system which includes an endless elastomeric orbitally movable conveyor belt for conveying coal from the input end to the discharge end of the conveyor disclosed. Various discharge methods are shown in applicant's co-pending application, however, these arrangements all require relatively high mine passageways and have been discovered to be unacceptable on most applications.

A crawler chain to be used on a conveyor such as that disclosed in U.K. Patent No. 1,373,170 is disclosed in U.S. Pat. No. 4,332,317. A troughed conveyor belt drive chain is shown in U.S. Pat. No. 4,282,971.

SUMMARY OF THE INVENTION

The preferred embodiment of the conveyor system, as disclosed herein, includes various unique features for facilitating the transport of materials from a first location, such as an area where a continuous miner is working, to a second location, such as where the receiving end of a second conveyor is positioned, wherein the travel path defined between the first and second locations includes horizontal and/or vertical curves.

While these unique features are particularly adapted for conveying materials along a curvilinear path, such as experienced in underground mining operations, it will be readily apparent that some of such features may be incorporated, either singularly or together, into above-ground conveying systems for conveying materials either along linear or curvilinear paths, as well as for conventional above and below ground flexible conveyors and thereby improve the same.

It is, accordingly, the principal object of the present invention to provide a conveyor system with an articulated conveyor in which the aforementioned problems of the prior art have been overcome which is simple and inexpensive in structure, reliable in operation, and is so constructed to present low-profile enabling the same to maneuver around pillars and through low-clearance passageways.

More particularly, an object of the present invention is to provide an improved articulated conveyor which is supported by the floor of a mine adjacent a fixed conveyor system and which is capable of traversing a curvilinear path while maintaining the conveyor run portion of an orbital conveying belt in an operative mode.

More specifically, an object of the present invention is to provide an articulated conveyor which includes a train of framework members which support a crawler chain or crawler track in engagement with the mine surface and which cooperate with adjacent framework members to maintain the entire conveyor train in a predetermined disposition relative to an elongated path along a mine floor.

Yet another object of the present invention is to support an orbitally moveable elastomeric conveyor belt within a relatively short distance of the mine floor to permit conveyance and discharge of mined material either while the entire conveying system is in motion or is stationary with respect to the mine floor.

Still another object of the present invention is to provide a conveyor with an improved traction drive system for moving the mobile articulated conveying system along the mine floor either straight or along curvilinear paths while substantially eliminating any binding or other deleterious forces normally associated with or resulting from moving a rigid member through horizontal or vertical curved paths.

Still another object of the invention is to provide a conveyor system having a flexible track drive system capable of bending around horizontally and/or vertical curves while delineating a fixed elongated path within a mine and while maintaining the discharge end in close side by side relationship with a stationary conveyor as the conveying system advances.

In pursuant of these and other objects, the present invention sets forth a conveying system comprised of a plurality of tandemly disposed framework members that are connected to one another by an articulated joint so as to permit each framework member to move universally relative to adjacent framework members and to permit the train of framework members to be moved in unison along a curvilinear path. Each of the framework members defines an open extent extending longitudinally therethrough which includes a means for supporting an orbital conveyor belt which extends longitudinally within the open extent of the conveyor train and is located above the track or crawler chain system also mounted on the framework members. Initially the bulk of the moveable conveying system is located in close side by side proximity to the fixed system. As the moveable system advances the discharge end also advances but always in side by side relationship to the fixed conveyor. A hopper and a transfer device continually transfer the material conveyed by the moveable conveyor system to the fixed conveyor system.

Mounted on the respective ends of adjacent framework members are portions that form the articulated joint which thereby connects adjacent framework members and permits universal movement of one framework member relative to its tandemly disposed adjacent framework member. In the preferred embodiment, the conveyor train is supported on the lower run of the crawler chain or track assembly which is capable of driving the conveyor train along the mine surface.

Mounted on the ends of adjacent framework members are structures which cooperate with one another so as to selectively limit the longitudinal movement of adjacent framework members relative to one another during a longitudinal movement thereof. Other structures are utilized to limit horizontal, vertical and twisting movement of the framework members so as to maintain both the conveyor belt and the crawler chain assemblies in proper alignment.

The articulated conveyor system is moved along the mine surface by traction drive means located in at least one of the framework members and capable of driving the track or crawler chain assembly or assemblies.

The crawler chain assemblies are composed of links formed to be driven by sprockets and to thereby move the conveyor system from place to place. The links are formed so that crawler pads may be fixedly attached to the chain links.

These and other advantages of the present invention will become more apparent upon reference to the following detailed specification and drawings.

DESCRIPTION OF THE DRAWINGS

In the course of the following detailed description, reference will be frequently made to the attached drawings in which:

FIG. 3a is a plan view of the coupling system between adjacent framework members.

FIG. 3b is a side elevational view of the connection system as shown in FIG. 3a.

FIG. 11 is an elevation view, partially in cross section, of the sprocket and crawler chain shown in FIG. 9.

DETAILED DESCRIPTION OF THE PREFERRED EMBODIMENT

Figure 1:
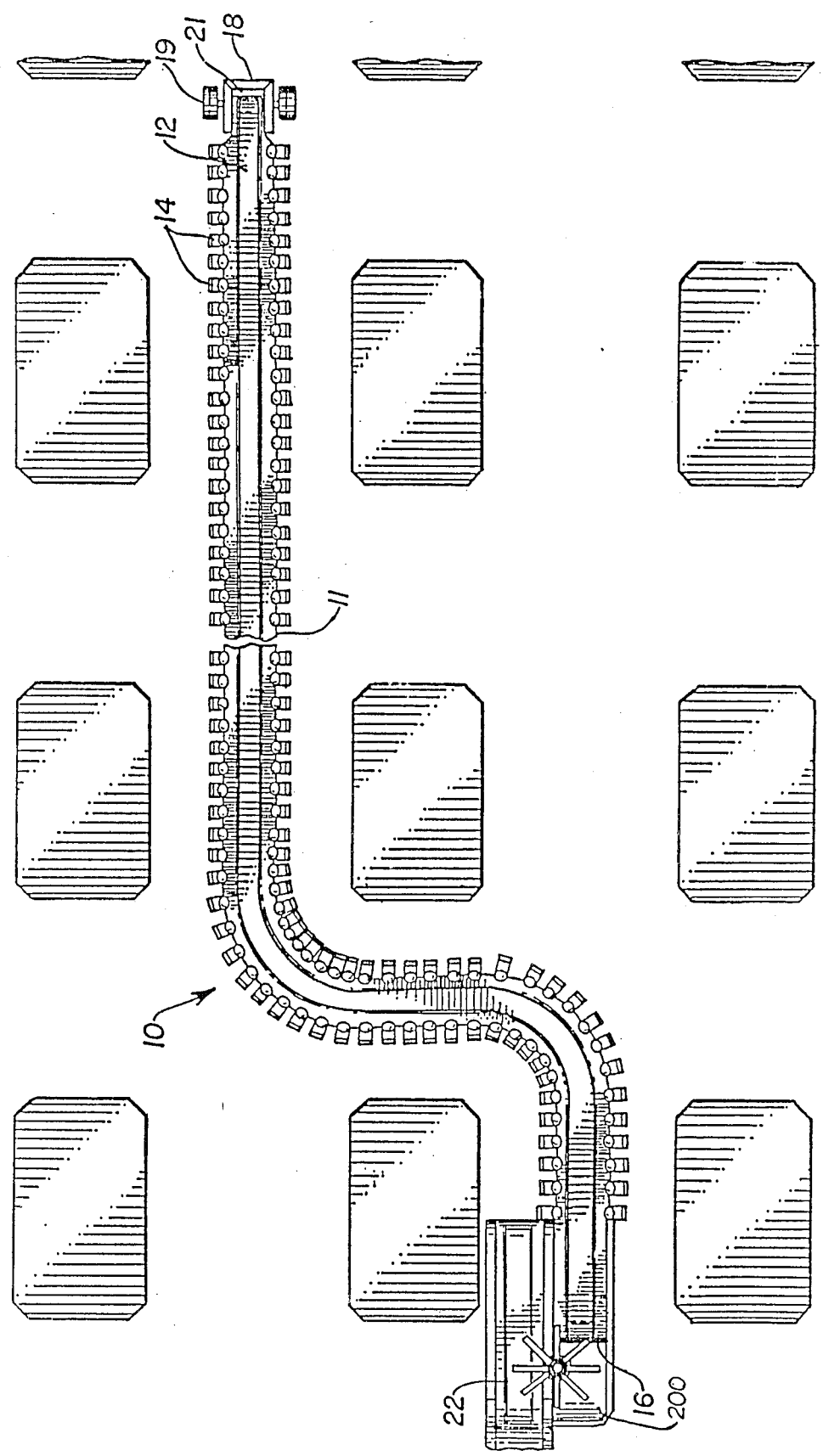
FIG. 1 is a diagramatic plan view of the conveyor system embodying the principles of the present invention.

In the following description, it is to be understood that such terms as "forward", "rearward", "left", "right", "upward" and "downward", etc., are words of convenience and are not to be construed as limiting terms.

IN GENERAL

Referring now to the drawings, and particularly to FIGS. 1 through 4, there is shown a conveying system having a mobile articulated conveyor which is adapted to be mounted above an endless crawler chain and which conveyor and crawler chain are capable of transversing curvilinear paths. This conveyor system is indicated generally by the numeral 10 and comprises the preferred embodiment of the present invention.

As is shown in FIGS. 1 through 4, the conveyor system 10 generally includes an articulated conveyor, generally denoted as 11, having an orbitally moveable conveying belt 12 supported by a train of framework members 14 interconnected in series which support the conveying belt 12 throughout the longitudinal extent of the train. In the preferred embodiment the train has a discharge end 16 and a material receiving end 18 at an end opposite the discharge end.

In the preferred embodiment, the receiving end 18 includes steering means for directing the advancing conveyor train along an elongated path within the mine. Steering means may also be included at the discharge end 16 to steer the conveyor system 10 during retreat from the mine face.

Each framework member 14 further supports one or more orbitally moveable crawler chain assemblies 20 located generally vertically below the conveyor belt 12.

As can be seen in FIG. 1, there is normally a stationary panel belt 22 located within the mine for receiving material discharged by the discharge 16 end of the conveying system. One method and arrangement of the actual discharge of material from the conveyor belt 12 onto the panel belt 22 will be discussed in detail hereinafter.

For purposes of illustration only, in the preferred embodiment the orbital conveying belt 12 is of the type originally disclosed in U.S. Pat. No. 4,387,801 to Merle Hoover entitled "Conveyor Belt". The Hoover belt is a pre-controlled stretchable belt formed of a stretchable elastic material having the ability to be pre-stretched or elongated by up to 10% as to maintain tension within the belt when going around curves. It is necessary to control and limit the elongation of the belt and various methods have been proposed to limit the stretch of the belt. Such methods are generally disclosed in U.S. Pat. No. 4,282,971 to Harry R. Becker entitled, "Conveyor Belt Chain and Method for its Use" and U.S Pat. No. 4,474,289 to Neal W. Densmore entitled, "Control Member for an Elongatible Conveyor Belt". The teachings of these patents are incorporated herein by reference.

FRAMEWORK MEMBERS

Figure 3:
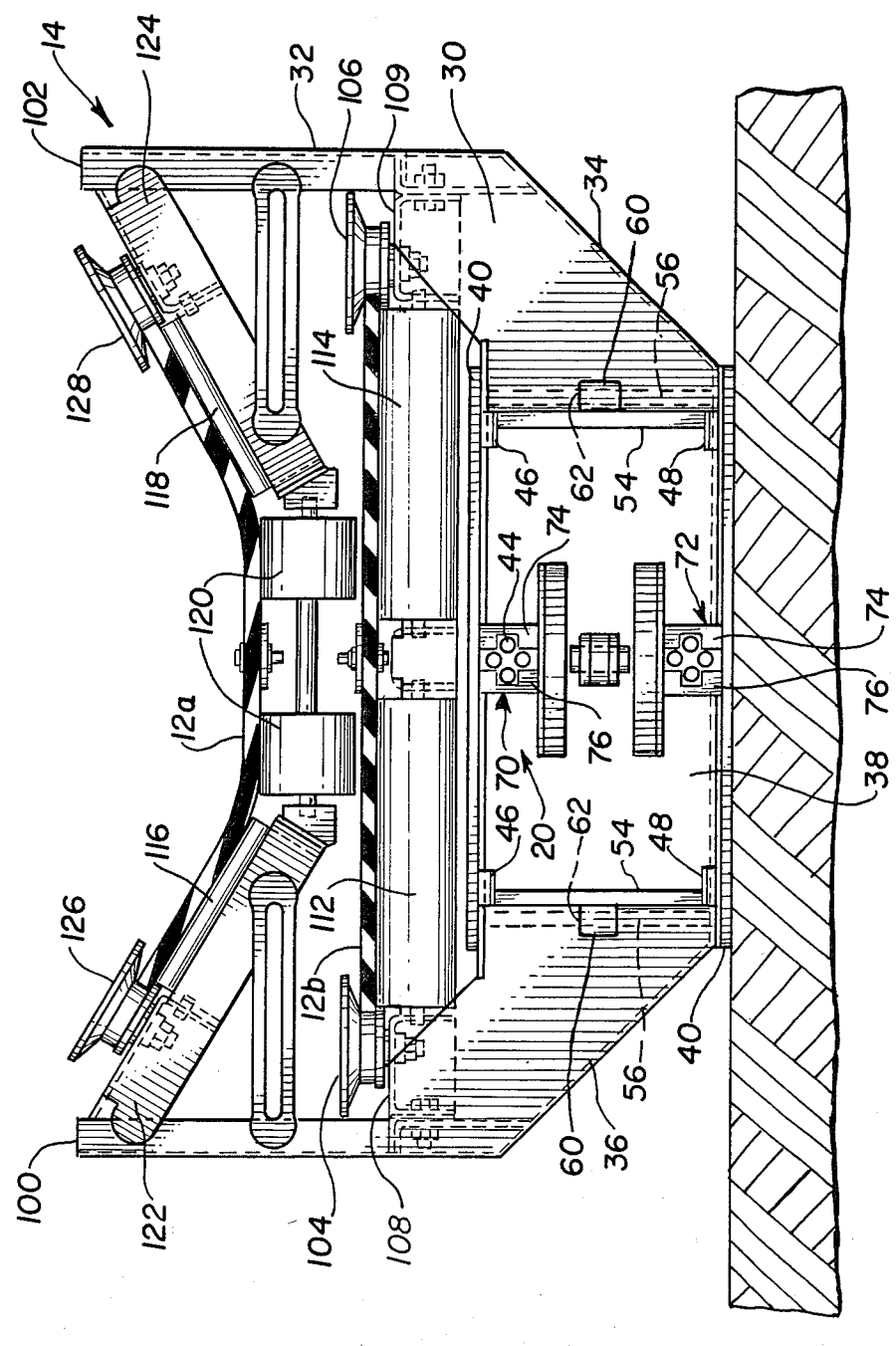
FIG. 3 is an enlarged sectional view of a typical framework member.
Figure 4:
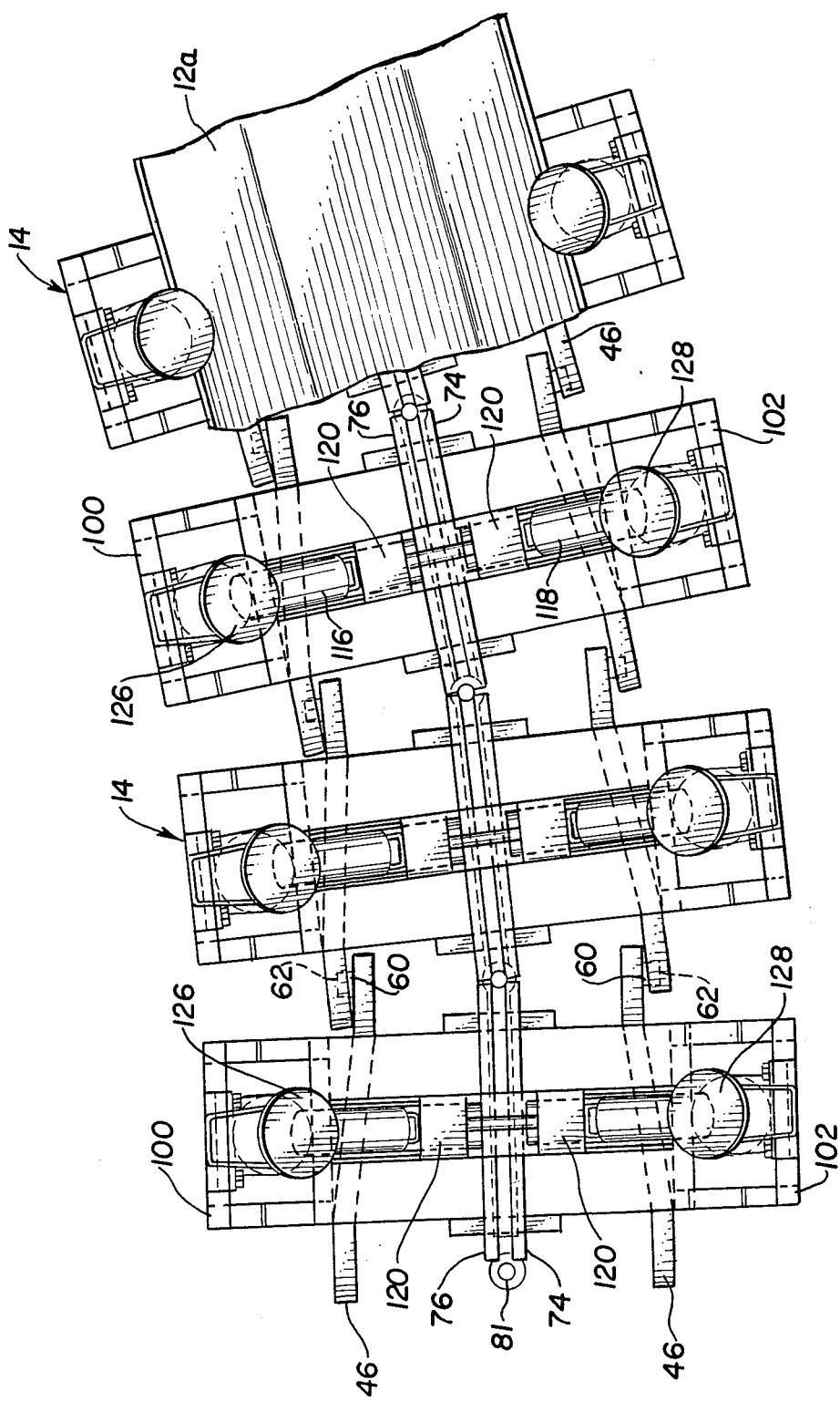
FIG. 4 is a plan view of the conveyor system of the present invention with the conveyor belt cut away.
Figure 5:
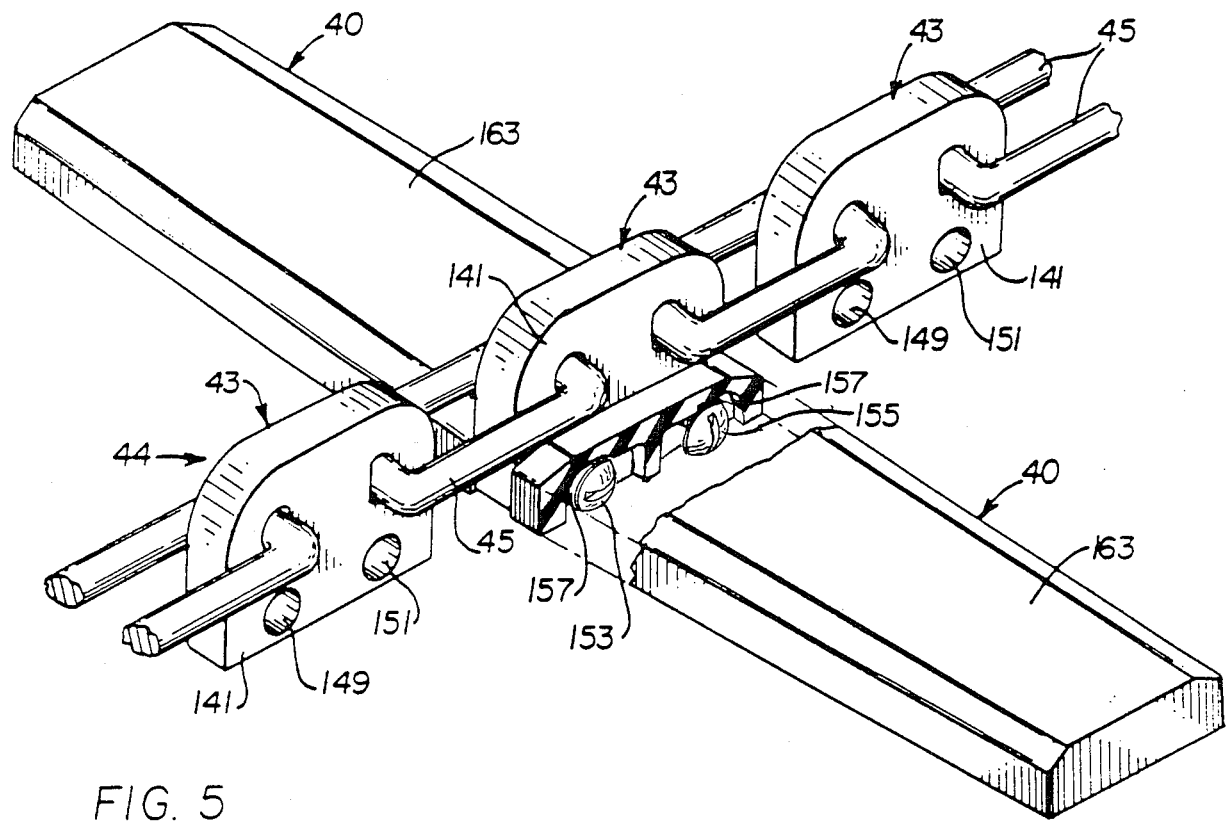
FIG. 5 is an isometric view of a section of the crawler chain and pads of the present invention.
Figure 6:
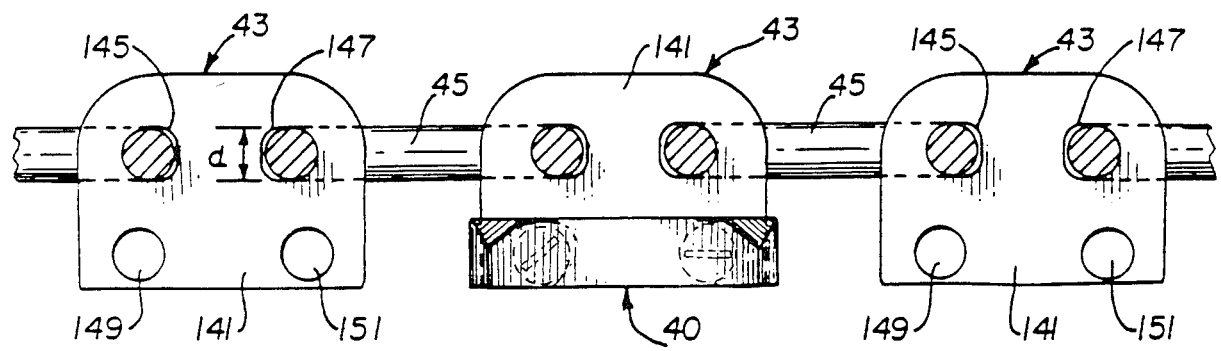
FIG. 6 is an elevational view of the crawler chain and pad shown in FIG. 5.
Figure 7:
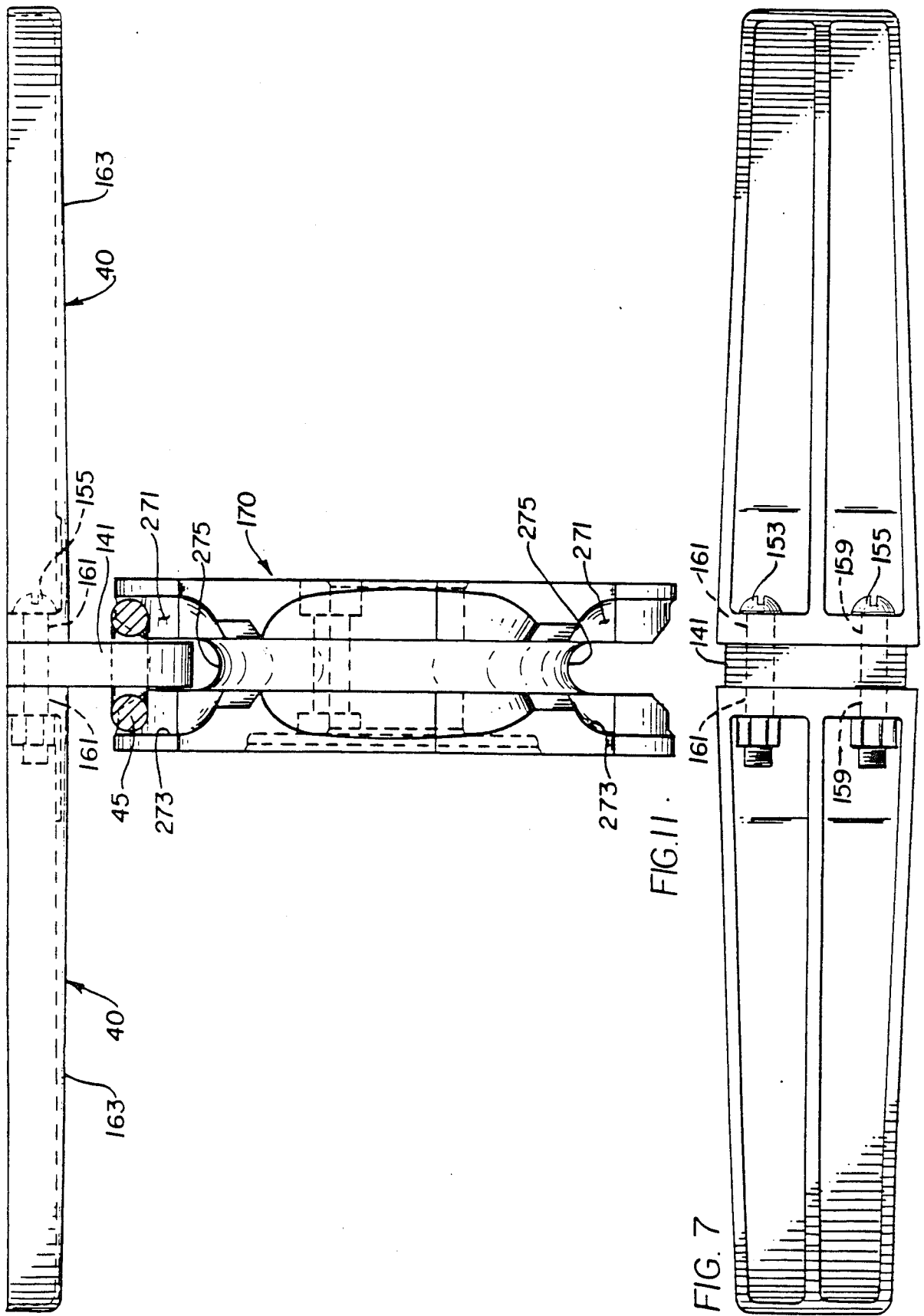
FIG. 7 is a bottom view of the crawler chain and pad shown in FIG. 6.

As discussed above, a plurality of framework members 14 are connected in series to form the elongated conveyor system 10. As can be seen in FIGS. 3, 4 and 5, each framework member 14 includes a bottom portion 30 which supports part of a crawler chain assembly 20 and, at predetermined intervals, the various drive components therefor. In addition, the bottom portion 30 of the framework member 14 supports an upper portion 32 which contains the support elements for the orbitally moveable conveyor belt 12.

In the preferred embodiment, the bottom portion 30 is composed of three sections. The two outer sections 34 and 36 serve to support the upper portion 32. A central portion 38 is utilized to support and guide the upper and lower crawler pads 40 and the drive chain 44. The combination of the upper and lower crawler pads 40 and drive chain 44 make up the crawler chain assembly 20.

In the preferred embodiment, the crawler drive chain 44 is formed in an endless loop of horizontal and vertical links with each crawler pad 40, attached to alternate vertical links of the chain in series along the entire length of the conveyor train. In the preferred embodiment, each crawler pad 40 is made up of two pieces attached to the chain 44 by means of a vertically-oriented U-shaped link member 43 which alternate in the chain 44 with typical horizontally oriented chain links 45. The U-shaped member 43 is made from a forged plate 141 typically 1 inch in thickness. The plate 141 has two holes 145 and 147 which accommodate adjacent chain links 45. The holes 145 and 147 are slightly larger in diameter than the diameter "d" of link 45 and are elongated in the longitudinal direction of the chain to allow the chain to collapse when not under tension. The plate 141 also has two holes 149 and 151 which allow each piece of crawler pad 40 to be bolted onto either side of plate 141.

In the preferred embodiment, a pair of cap head bolts 153 and 155 are used to clamp each piece of pad 40 to both sides of the plate 141 of link 43. Each piece of pad 40 has a recess 157 formed in the top of the pad 40 to entrap the flat the hex nut threaded onto the threaded portion of bolts 153 and 155. The recess 157 is so dimensioned in relation to the bolt holes 159 and 161 in each piece of pad 40 so that the distance from the apex of each side of the hex nut to the bolt center is less than the distance to the top of the recess 157 of the top portion 163 of pad 40. The distance from the bolt center to the flat on the hex nut is less than the distance to the top of the recess 157 so that the hex nut can be inserted into the recess 157 but cannot rotate. The horizontal links 45 of chain 44 interact with the U-shaped member 43 when chain 44 is in tension to thereby move each crawler pad 40 along at the same speed as the drive chain 44.

In the preferred embodiment, the horizontally-oriented chain of the link 45 engages a special sprocket 170. The sprocket 170 is designed to drive chain 44 and is specially shaped to capture at least one link 45 and to thereby drive said link for at least a portion of each revolution of the sprocket 170. As can be seen in FIG. 11, as the sprocket rotates successive links 45 engage, are driven and disengage the sprocket. The vertical links 43, which alternate with horizontal links 45, pass freely around the sprocket and are not driven.

In order to drive horizontal link 45, the sprocket 170 has formed pockets 271 which conform to the outside surface of link 45 to thereby smoothly engage and disengage from said link. Force is transmitted from the pockets on the sprocket bearing on the exposed outside end portion of the link. Between the pockets, the sprocket has cutaway portions 273 along its centerline to provide clearance for vertical links 43. Laterally of each pocket 271, the sprocket has U-shaped cutouts 275 to allow dirt and coal particles to escape from the chain sprocket interface.

In the preferred embodiment, each bottom portion 30 of framework member 14 supports a pair of top runners 46 and a pair of bottom runners 48. As can be best seen in FIGS. 3 and 4, the runners 46 and 48 extend beyond the end portions 50 and 52 of the bottom portion 30.

The runners 46 and 48 are supported by two pairs of stop plates 54 and 56. Each pair of stop plates 54 is welded to the end 50 of the bottom portion 30 on opposite sides of the central portion 38. Each support plate 56 is fixedly attached to the end 52 of bottom portion 30 adjacent the central portion 38 thereof. In the preferred embodiment, the runners 46 and 48 which are associated with ends portions 50 and 52 are offset so that the upper and lower runners on adjacent framework members intermesh, thereby providing continuous support for the upper and lower crawler pads 40.

In addition, in the preferred embodiment, the stop plates 54 and 56 are adapted to interact with the adjacent stop plate 54 or 56 of the adjacent framework member to limit the side-to-side motion therebetween. The limitation of horizontal angular movement between adjacent framework members 14 is provided by a pin-and-slot arrangement which can be best seen in FIG. 4. A pin 60 is fixed to stop plate 54 and is positioned to engage a slot 62 in stop plate 56. In the preferred embodiment, the pin and slot are arranged approximately equal distance from the top and bottom of stop plates 54 and 56.

In the preferred embodiment, when the framework members are aligned in a straight line, the pin 60 is centered within slot 62. When the conveyor train 10 negotiates a horizontal curve, the angular displacement in the horizontal plane between adjacent framework members 14 is limited, in either direction, by the pin 60 impinging on an end 64 of the slot 62. In the preferred embodiment, the permitted articulation between framework members 14 is approximately 5 degrees in either direction. It should be noted that while the pin is horizontal in the arrangement described, the pin could have just as easily been oriented in a vertical direction with no loss of flexibility between framework members.

The above described pin-and-slot arrangement also limits the roll (about a longitudinal axis) allowed between adjacent framework members 14. This limiting function is controlled by the width of slot 62 versus the diameter of pin 60. The difference between the width of slot 62 and the diameter of pin 60 permits approximately 2½ degrees of roll between adjacent framework members. In the preferred embodiment, this means that the difference between the width of the slot and the diameter of the slot is approximately one inch. This roll limitation is necessitated by the normal condition of the mine floor which is generally very uneven.

In the preferred embodiment, the central portion 38 of the bottom portion 30 is provided with chain guides generally denoted as 70 for the upper chain guide and 72 for the lower chain guide. Each chain guide 70, 72 is composed of a pair of identical guide members 74 and 76. In the preferred embodiment, each chain guide member 74, 76 extends beyond the end plates 50, 52 of the bottom portion 30 a sufficient distance to support the chain in the space between two adjacent framework members 14 and to act as a stop as described below. The preferred chain guides are of a cruciform shape so that alternate links of the chain 44 are maintained in parallel, but at right angles to the intermediately adjacent link. This structure positively entraps the chain keeping the links from either going upwards or sideways or twisting.

The central portion 38 additionally supports a longitudinally extending force transmission member 78. In the preferred embodiment, the force transmission member 78 is a tube which passes through end-plate members 50 and 52 and is fixedly supported thereby. As seen in FIGS. 3a and 3b, each end of tube 78 is provided with the necessary connection to form a universal type connection with each adjacent tubular member associated with an adjacent framework member 14. In the preferred embodiment, the tube 78 has a first end with a clevis-type arrangement 79 and a second end with a spherical ball joint arrangement 81. When the adjacent framework members 14 are interconnected as by pin 83, the opposite ends of the adjacent tube 78 are mated such that the clevis and ball joint are interconnected thereby forming a universal connection. This universal connection, of course, allows universal movement between adjacent framework members 14 and also transmits longitudinal forces (push and pull) between framework members.

The tubular member 78 may be made of telescoping parts (not shown) which may be extended to take up slack in both the belt 12 and the chain 44 as wear of these parts occurs. A pin arrangement would be used to lock the telescoping parts of member 78 in an extended position.

The universal movement between framework members is limited in the vertical direction by the chain guides 70 and 72. In the preferred embodiment, the chain guides extend within a predetermined distance of one another to limit the vertical angular displacement between adjacent framework members 14 to approximately 6 degrees. The 6-degree limit would determine the maximum angular displacement between framework members as the conveyor train moves up or down an inclined surface. As can easily be seen, the upper chain guide 70 would determine the limit when the conveyor is progressing along an upwardly sloped incline and the lower chain guide 72 would provide the limit when the conveyor is progressing downwardly along an incline.

In the preferred embodiment, the point of universal connection between ends 80 and 82 of tube 78 (FIG. 3A) are in line both vertically and longitudinally with the pins 60 located on each of plates 56. This arrangement allows the limits on both the twisting and horizontal movement of the conveyor, as discussed above, to be independent of the vertical inclination between adjacent framework members (i.e. as the leading framework member 14 starts going up an incline).

In the preferred embodiment, each crawler chain is driven at its ends, that is, at each end of the two end loops of each continuous crawler chain by a series of interspersed framework members 14a containing one or two drive means, the spacing of which is determined by mine conditions. Generally, the drive framework members 14a are spaced about 40 to 50 feet apart and coincide with the length of each separate crawler chain assembly 20.

While there may be 8 or 10 drives in a 400 foot train, only one such drive containing framework member 14a will be described here.

The crawler chain assembly 20 can be either one continuous chain or can be made up of a plurality of distinct chain assemblies 20. In a typical 400 ft. long conveyor, either one assembly 20 chain approximately 800 ft. long or a series of chain assemblies 20 could be used. For example, if fifty foot long closed loop chain assemblies 20 were used, then eight (8) chain assemblies 20 would be required. Each chain assembly 20 would have a total chain length of about 100 feet. While it may be possible to leave some space between adjacent chain assemblies, this non-driven space should be minimized since the unsupported framework members would drag along the ground. Also, it is necessary to have the crawler chain drive system below the conveyor belt 12 for substantially the entire length of the train (as outlined above) to prevent buckling of the belt around curves.

In the preferred embodiment, the spacings between the centers of adjacent crawler pads 40 is approximately 12 to 14 inches with each crawler pad being a cast steel shape approximately 5½ inches wide and 1 inch high. The framework member 14a containing the chain drive is structurally similar to the framework members 14 described above but is about twice as wide to house the two chain drives so only the differences will be discussed. In the preferred embodiment, when two circumferential chain drives are housed in a framework member 14a, the framework member consists of two framework members 14 bolted together along plates 260 and 262 by bolts 197. The main difference between a framework member 14 and a framework member 14a is that the framework member 14a contains drive sprockets and the drive means necessary to drive both sprockets. It should be noted that in the preferred embodiment the last chain drive sprocket and motor is housed alone in a standard framework member 14 which can be fixedly attached to the inlet or outlet hopper.

Figure 10:
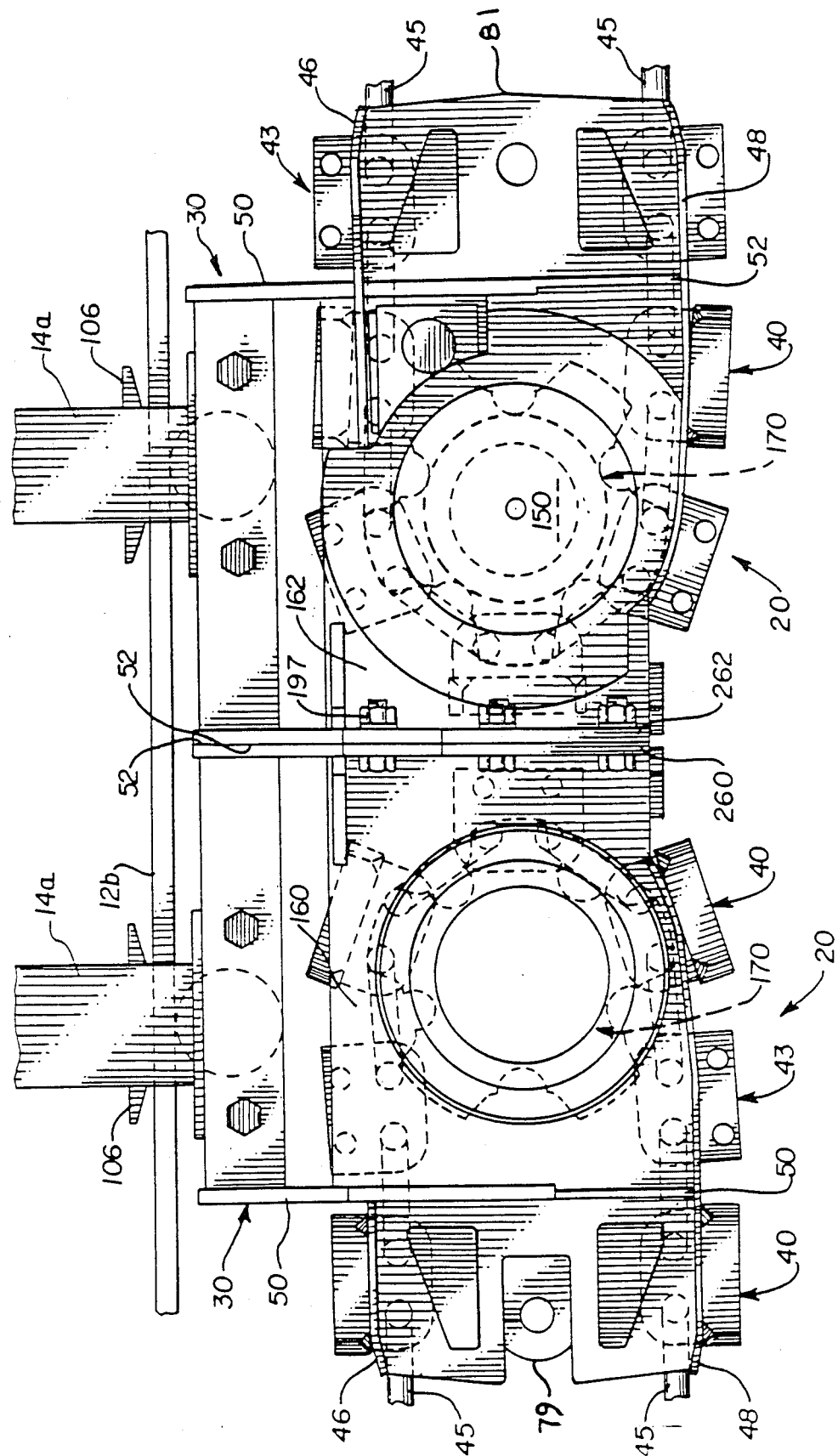
FIG. 10 is an elevation view of the drive framework member including the drive sprocket of FIG. 9.
Figure 12:
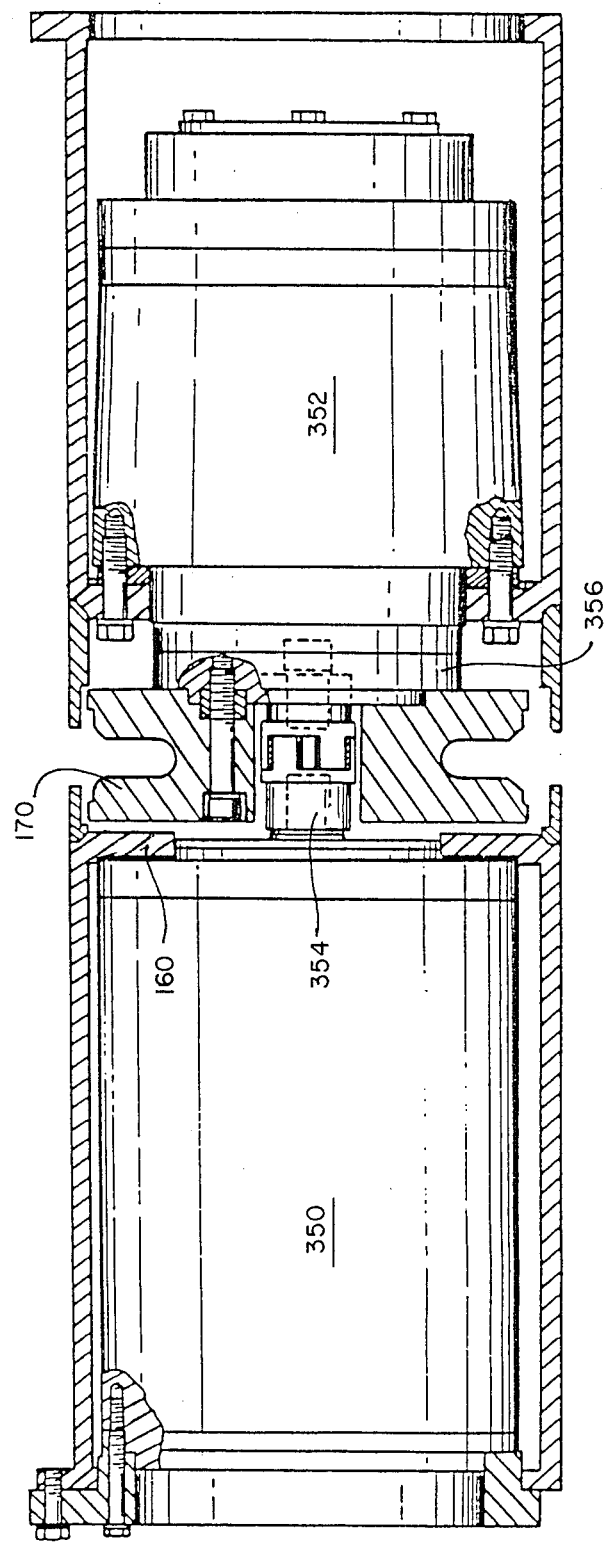
FIG. 12 is a cutaway view of the framework member containing the drive system of the present invention.

As can be seen in FIGS. 10 and 12, the bottom portion 30 of the drive framework member 14a which contains drive sprockets 170 includes a motor 350 and a planetary gear assembly 352 interconnected by an input shaft 354. The planetary gear box 352 includes an output shaft 356 which drives sprocket 170. While in the preferred embodiment, the gear box 352 is a planetary drive assembly any well-known gear speed-reducing assembly can be utilized to drive the sprocket 170.

In the preferred embodiment, the motor 350 is an alternating current electric motor having a power output of approximately 10 horsepower, however, it can be seen that any convenient power source such as hydraulic or pneumatic can be utilized.

As indicated above, the framework members 14a containing drive units are, in many respects, identical to the framework member 14 described above. It should be noted that the force transmission member 78 is removed and replaced by longitudinal running plates 160 and 162 (FIG. 10) and transversely running center plates 260 and 262. Plates 160, 162, 260 and 262 not only act as a force transmission members through the longitudinal axis extent of the framework member 14a, but also served to mount both the motors and gear reducers 350 and 352 respectively.

The universal connection points 79 and 81, on the framework members 14a are welded directly on end plates 50 and 52 rather than being attached to the ends 80, 82 of the force transmission member 78 as is the case in the other framework members 14. It should be noted, that in the preferred embodiment, the drive elements described for each sprocket system above fit within the standard 2 ft. length utilized in the preferred framework members 14. Therefore, the single end drives for the last crawler chain drive assemblies 20 in the train can fit in a single framework member 14a. In the preferred embodiment, the framework member 14a of the dual drive system shown in FIGS. 8 and 10 comprises two standard framework members 14 bolted together by bolts 197 through plates 260 and 262.

As can be seen in FIGS. 3-5, each framework member 14 has an upper portion 32 constructed as to define an opening extending generally longitudinally throughout the conveyor train. Within this opening, each framework member 14 upper portion 32 includes mounting means for supporting an orbital belt within the open extent of the conveyor train. Since, as indicated above, all of the framework members 14 are identical, with the exception of the framework members which contain the drives for chain 44, only one will be discussed in detail. The belt training system will be discussed in detail below.

As can be seen in FIG. 3, the upper portion 32 of each framework member 14 includes left and right conveyor belt support members 100 and 102. Support members 100 and 102 are bolted to the side portions 34 and 36 of the bottom portion 30. There exists a generally open area between member 100 and 102 directly above bottom portion 30.

A plurality of rollers comprise the means mounted on each framework member 14 for moveably supporting the orbital conveying belt 12 within the open area of the carriage train. An upper series of rollers are provided for supporting the upper conveying run portion 12a of the belt 12 and a lower series of rollers are provided for supporting the lower run portion 12b of the belt 12.

Edge rollers 104 and 106 are mounted on brackets 108 and 109 respectively which are mounted across the bottom portion 30, thereby supporting edge rollers 104 and 106. The brackets 108, 109 are attached in any convenient manner to the end portions 34, 36 of bottom portion 30. In the preferred embodiment, a pair of belt support rollers 112 and 114 are also supported by and within bracket 108, 109.

In the preferred embodiment, the upper conveying run portion 12a of the belt 12 is supported by respective left and right troughing idlers 116 and 118 and a centrally-disposed dumbbell idler 120. As can be seen in FIG. 3, the troughing idlers 116 and 118 are disposed at a predetermined angle with respect to dumbbell idler 120 to give and maintain the upper conveying run 12a in a trough-shaped configuration. The troughing idlers 116 and 118 are maintained at this predetermined angle by a pair of support brackets 122 and 124.

For maintaining the upper conveying run portion 12a of the orbital belt 12 in an operative position on the troughing idlers 116 and 118 and the dumbbell idler 120, each framework member 14 is provided with a respective left and right upper edge idler 126 and 128. The edge idler 126 is supported on bracket 122 and the edge idler 128 is supported by bracket 124. As can be seen in FIG. 3, the left and right edge idlers 126, 128 rotate about an axis oriented generally perpendicular to the axis rotation of troughing rollers 116 and 118. This orientation of the edge rollers provides rolling support for the edge of the belt and minimizes scuffing.

The dumbbell roller 120 is so formed to allow space for the stretch limiters (described in U.S. Pat. No. 4,474,289) that control th elongation of the belt. The edge rollers 104 and 106 perform the same function for the lower run of the belt 12b as do the edge rollers 126, 128.

In the preferred embodiment, the belt 12 is driven at each end of the elongated conveyor train by an electric motor and speed reducer (not shown). The details of this drive are taught in U.S. Pat. No. 4,339,031 in FIGS. 21-23, and are incorporated herein by reference. It can be seen that there are any number of well-known methods for driving an orbital conveyor belt which could also be utilized in the present conveyor train.

In the preferred embodiment, the conveyor train is normally between 200 and 500 feet long, although any convenient length can be utilized as long as there is sufficient power to drive both the crawler chain and the conveyor belt. In the preferred embodiment, each framework member 14 has a length of approximately two feet, the length being in the direction of the longitudinal extent of the conveyor train and being measured between the centers of adjacent U-joint connections.

It should be noted that not every framework member 14 need have support structures for the belt 12 and the crawler system chain assembly 20 as long as sufficient support is provided by the framework members 14 which do have these structures. For simplicity, every framework member of the preferred embodiment has such support members.

Figure 2A:
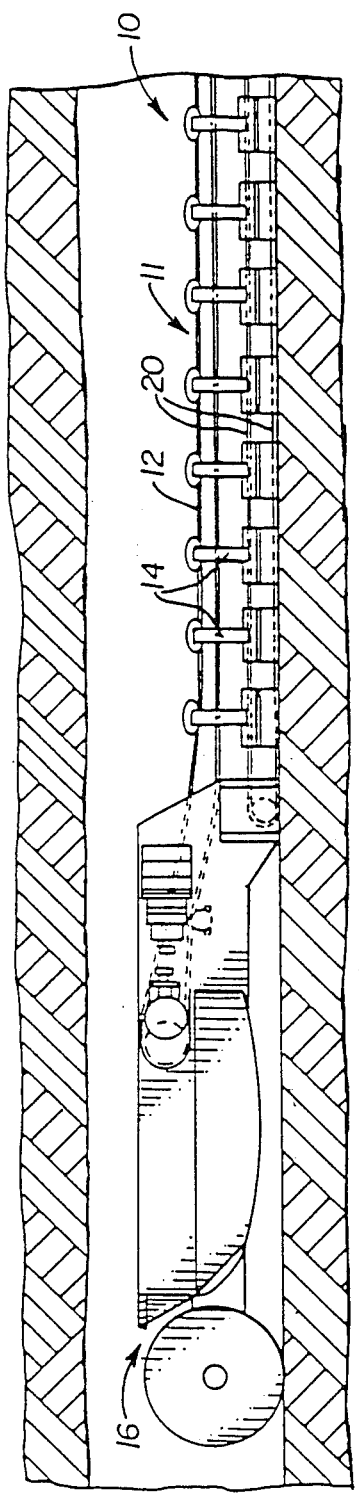
FIG. 2a is a fragmentary side elevational view of the discharge end of the conveyor system.
Figure 2B:
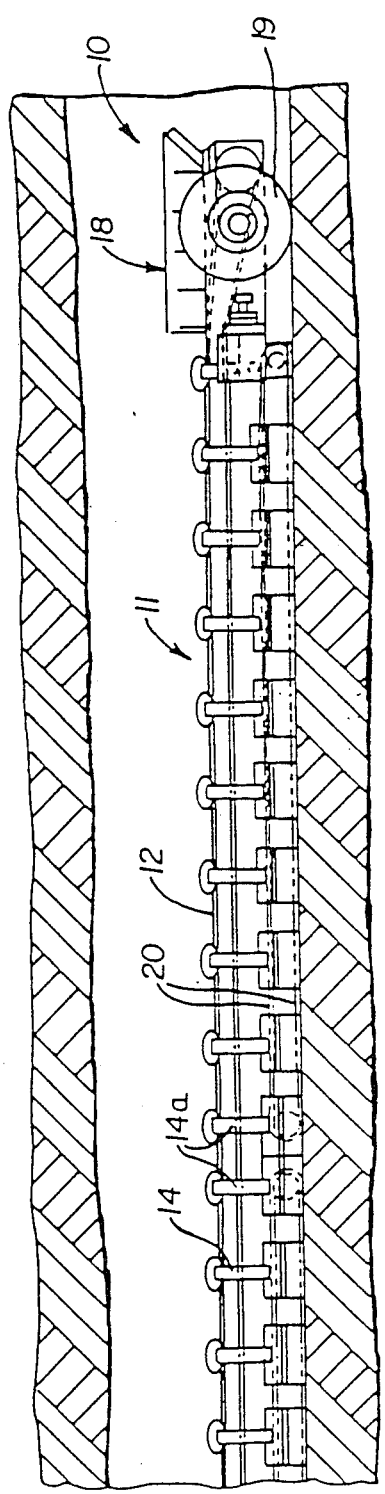
FIG. 2b is a fragmentary side elevational view of the input end of the conveyor system.

It should also be noted that a take up system (as shown in FIG. 2 of U.S. Pat. No. 4,339,031) may be utilized at each end 16 and 18 of the conveyor system 10 to maintain proper tension in the elongatable belt 12. A similar tensioning system can be used to maintain proper tension in the chain 44 of each crawler chain asembly 20 as wear occurs between the links thereof.

OPERATION

In the preferred embodiment, the input end 18 is capable of advancing around curvilinear paths within a room-and-pillar type coal mine. In the preferred embodiment, the curvilinear paths have radii of curvature of approximately 25 feet. This allows the use of 60 degree cross cuts which are typical in many mines. It is, of course, advantageous to minimize the radius of a curvature of the articulated conveyor system 10 to permit tighter turns.

It is envisioned that the conveying system 10 as taught herein will provide a mobile conveying system which can simultaneously convey material from the input end 18 to the discharge ends 16 while advancing on the crawler system as described above, through an elongated path in an underground mine. In general, it is envisioned that the input end 18 would be steerable in some fashion as by wheels, 19, shown in FIG. 1, to follow the output of a continuous mining machine for example, or a mobile mineral feeder crusher car or even a mineral loading machine.

In order to facilitate loading the end 18 may be equipped with a hopper-like framework member 21 which would include the conveyor belt 12 drive system. As can be seen from the above description, the conveying system can continuously convey the material received from any of these mining machines while at the same time advancing or retreating.

For purposes of explanation only, the operation of the conveying system as it would occur following a continuous mining machine shall be described.

A typical continuous mining machine has a discharge conveyor which is articulated and can be swung from side to side as its discharges material. In the preferred embodiment, the conveying system 10 would utilize a hopper 21 on the receiving end 18 of the conveyor. The continuous conveyor belt 12 would extend a predetermined distance within the hopper to insure gathering and transporting together all the material deposited by the continuous mining machine.

In a typical mining situation, the conveyor system 10 would, as indicated above, extend for approximately 200–500 ft. with, at least initially, the majority of the conveying system positioned alonside the panel belt 22. As the continuous mining machine advances into the mine face, the crawler chain drive system would propel or advance the conveyor 10 along with the advance of the continuous mining machine so that the hopper 21 of input end 18 is always positioned to receive the discharge from the rear discharge conveyor of the mining machine. In the preferred embodiment, the electrical controls cause each of the plurality of crawler chain assemblies to drive (and stop) simultaneously.

The path that the conveyor system 10 follows is that path delineated by the steerable input end 18. Should the continuous mining machine cut a corner to form a cross-cut, the conveyor system 10 would turn in a like manner to follow the continuous mining machine. The crawler system, whether composed of one crawler chain assembly 20 or a plurality of such crawler chain assemblies 20, inherently maintains the position of the entire conveying system along the path delineated by the input end 18 since only the upper pads of the crawler chain move with respect to the ground. The lower strand of crawler pads maintains the shape of the elongated path since these pads are substantially fixed as the conveying system 10 advances. As the conveying system 10 advances, the discharge end 16 approaches the input end point of the fixed conveyor 22. However, during normal function of the conveyor train, this point of advance would never occur since the panel belt 22 would then have to be extended in order to insure the conveying of mined materials discharged from the conveyor 10.

It can be seen, however, that if one were to tram the conveying system through the mine, such as when one would want to move the conveying system from one section of the mine to another, then the last framework member 14 would represent the point where the last crawler pad would be picked up off the ground and the first framework member 14 adjacent end 18 would always represent the point where the crawler pad 40 is first laid on the mine surface. All the intermediate crawler pads in contact with the mine floor would remain substantially stationary while the conveyor train advances until the trailing end of the conveyor system picks up the pad 40. Conversely, the conveyor pads 40 of the upper run are in continuous motion until they are laid down by the leading end of the conveyor. As can be seen, the path or track formed by the crawler chain is as fixed as if there were rails laid on the mine floor. The advantages of the mobile conveying system taught herein when compared to a mobile conveying system utilizing wheels should be obvious. When a conveyor system utilizing wheels is used, there is nothing to constrain the conveyor to a fixed path as it advances. This is especially so when a wheel conveying system goes around a curve.

Figure 8:
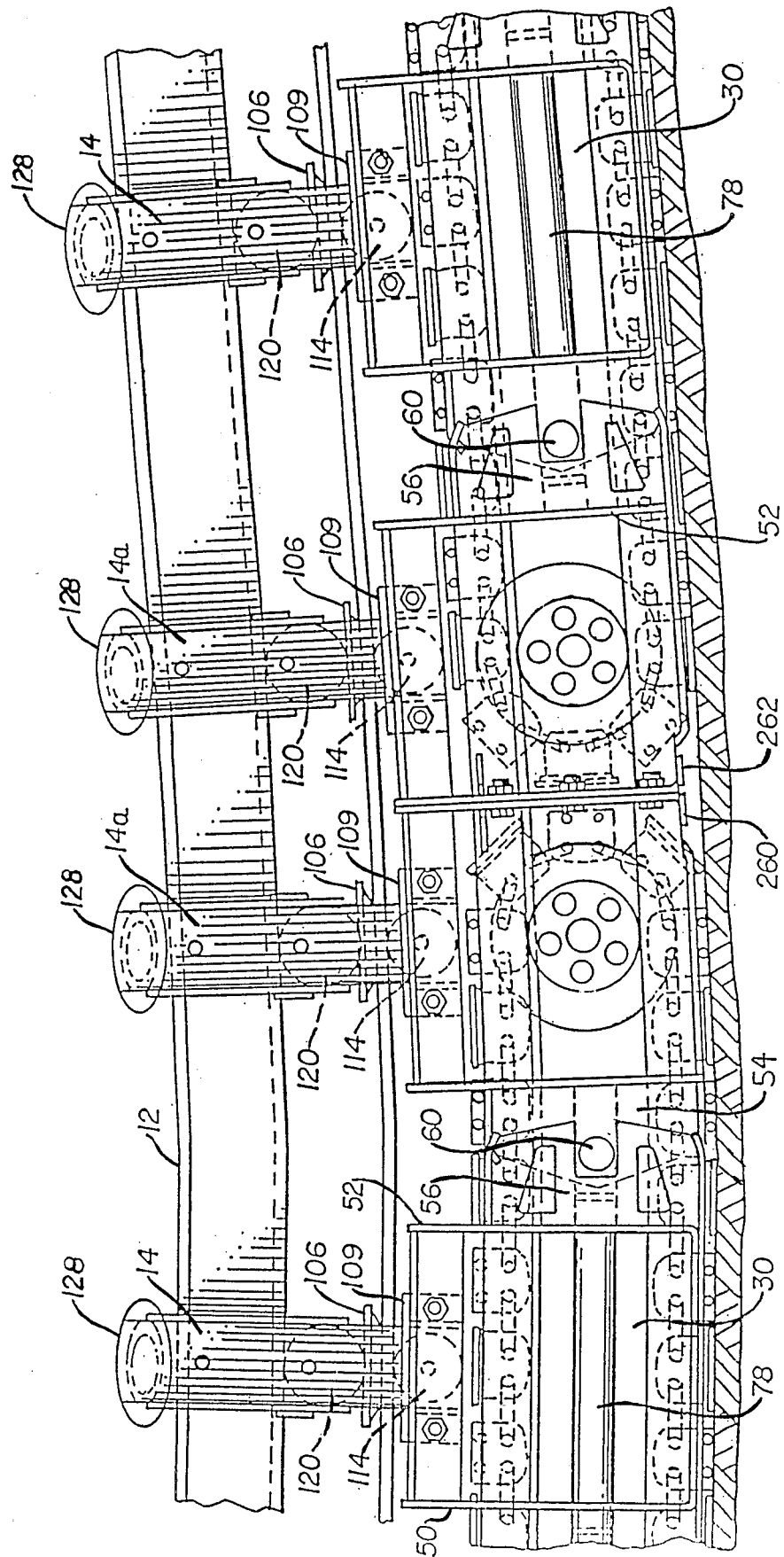
FIG. 8 is an elevational view of the conveyor train of the present invention showing the drive system for the crawler chain.
Figure 9:
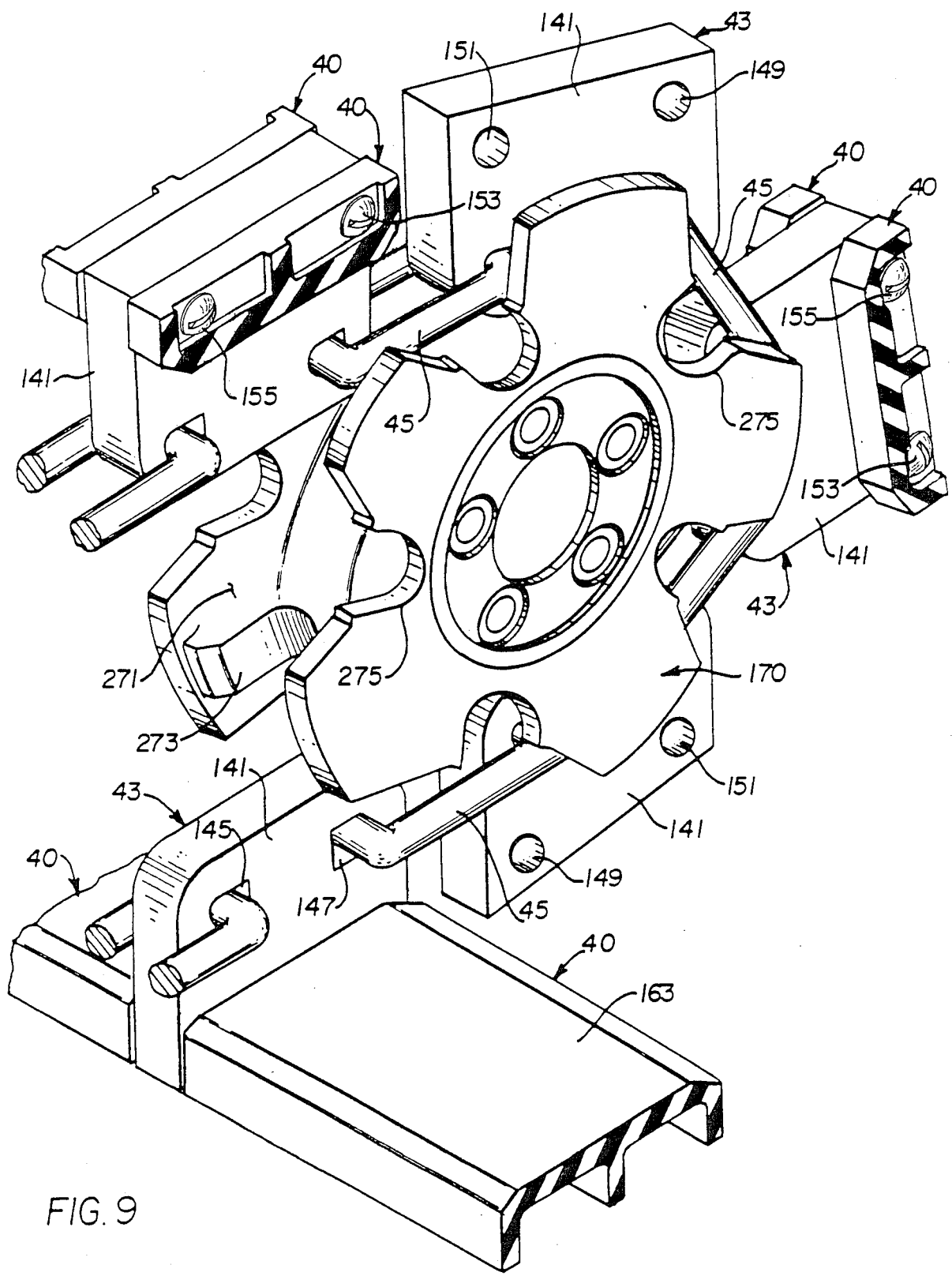
FIG. 9 is an isometric view of the drive sprocket and chain of the present invention.

As can be seen in FIG. 8, not every chain link 43 has a pad 40 bolted thereto. In the preferred embodiment, while the formed links 43 alternate with chain links 45, only alternate links 43 have crawler pads 40 attached. It has been found that the above-described tracking function of the crawler chain assemblies 20 is not hindered by the elimination of alternate crawler pads 40 from the alternate links 43. Of course, at some point eliminating too many pads 40 from links 43 would prove to be insufficient to hold the conveyor train on its path.

DISCHARGE

Figure 13:
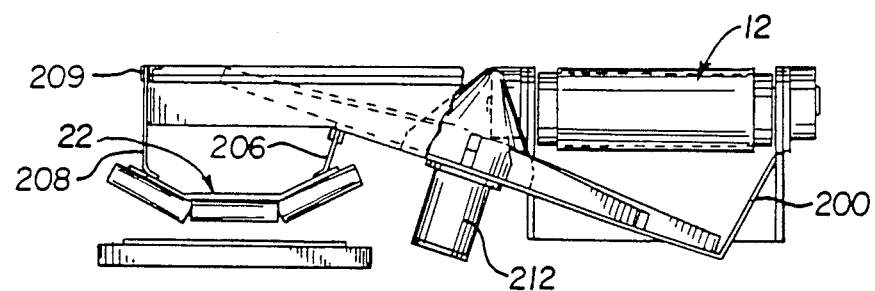
FIG. 13 shows an end sectional view of a discharge scheme of the present invention.
Figure 14:
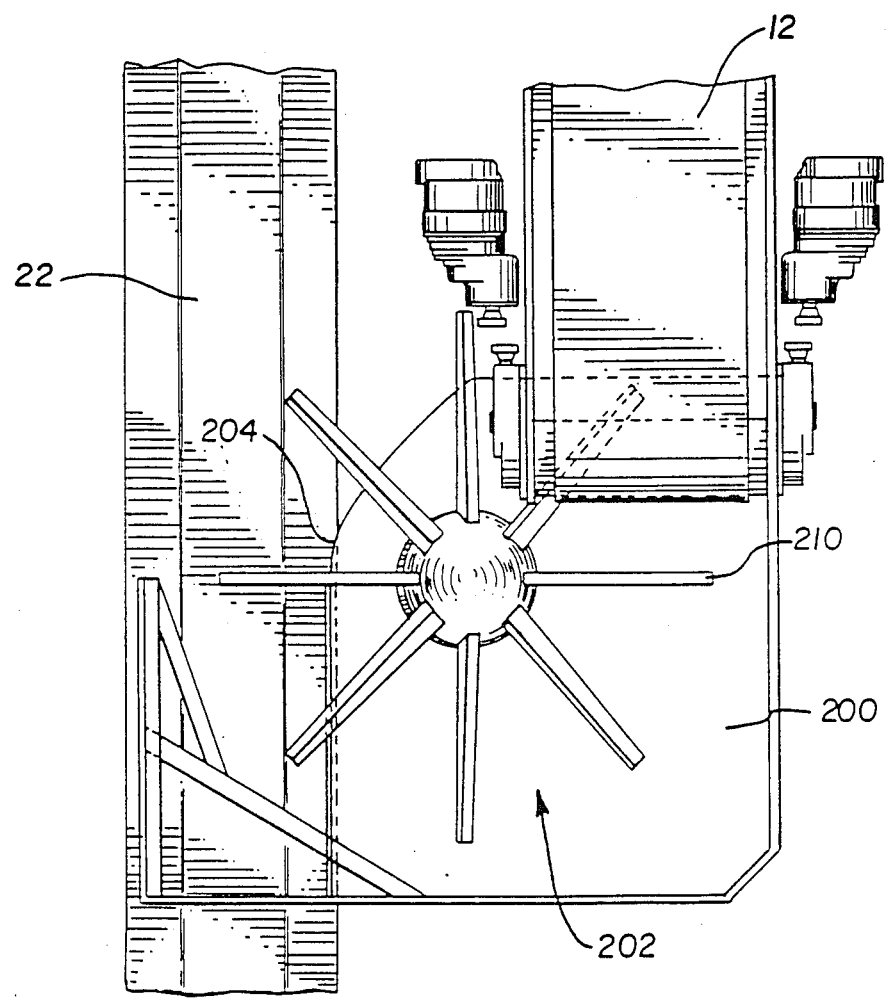
FIG. 14 shows a plan view of the discharge scheme for the conveyor train of the present invention.

As seen in FIGS. 13 and 14 in the preferred embodiment the conveying system 10 is initially located in close side by side proximity with the stationary conveyor system 22. As the conveyor input end 18 advances into the mine the discharge end moves towards the direction of advance but always in the same side by side relation to the fixed conveyor 22 as originally located. As described above the crawler pad arrangement ensures that the discharge end 16 is along the same path as initially laid out by the entire conveyor system regardless of the curvature of the path. Input end 18 follows as the mining machine and conveyor system advances.

In the preferred embodiment the discharge end 16 is equipped with a hopper 200 which receives the material discharged from the belt 12. A rotating feeder arm assembly 202 is utilized to transfer the material from the hopper onto the belt conveyor 22. In the preferred embodiment the hopper 200 is so shaped that the edge thereof 204 adjacent the belt 22 extends a predetermined distance over the belt 22 and has a guard device 206 which prevents material forced onto the conveyor by the rotating assembly 202 from spilling onto the mine floor. Similarly a rubber deflector 208 is utilized on the far edge of the hopper assembly 209 extending downwardly into engagement with the belt 22 to prevent material from spilling on the mine floor from the far edge of the conveyor belt.

In the preferred embodiment the rotating discharge device has a plurality of arms 210 which move the coal from the hopper 200 onto the conveyor 22. As can best be seen in FIG. 10 the direction of rotation of the discharge assembly 202 is in the clockwise direction.

In the preferred embodiment the discharge arm assembly 202 is driven by an electric motor 212. In the preferred embodiment the discharge assembly and the drive motor 212 are inclined with respect to the horizontal so that the material conveying systems 10 and 22 can be at approximately the same level with an unlimited height of a mine shaft or entry. The hopper 200 extends below the belt level 12 and the conveying system 10 and is inclined such that the materials moved upwardly over the belt 22 are discharged thereon.

As can be seen in FIGS. 13 and 14, as the input end of the conveying system 10 advances, material is discharged continually on to the belt 22 until the end nearest the mine face thereof is reached. At this time the fixed or stationary belt 22 must be extended a distance approximately equal to the length of the conveying system 10 so that further advance may be initiated. Of course upon the initiation of the second advance the two conveying systems must be in close, parallel, side by side proximity.

It should be noted that the discharge scheme disclosed above and in FIGS. 13 and 14 could be utilized with any conveyor system in which an advancing conveyor system has its discharge in side-by-side proximity with a stationary conveyor system during said advance.

I claim:

1. A self-propelled material conveying system capable of traversing a surface along a curvilinear path, said system comprising:

a plurality of framework members arranged in tandem on said surface along a portion of said path to form an elongated longitudinally extending conveyor train;

connector means on each framework member cooperable with connector means on each adjacent framework member for coupling said plurality of framework members, said connector means permitting movement between adjacent framework members;

a first plurality of said framework members including means for supporting orbitally movable crawler chain assembly including crawler chain pads, said crawler chain assembly extending continuously throughout said first plurality of framework members along the longitudinal extent of said train, said first plurality of framework members each including a lower portion wherein said crawler chain pads are maintained in engagement with said surface, said support means each including lower legs extending from each of the longitudinal ends of adjacent framework members such that the lower legs of adjacent framework members extend longitudinally adjacent to one another;

said framework members including means for supporting an orbitally moveable conveyor belt above said crawler chain assembly, the conveying run of said orbitally moveable conveyor belt operable to convey material substantially throughout the longitudinal extent of said train;

means for simultaneously orbitally during said orbitally moveable crawler chain assembly to thereby propel said material conveying system along said path in engagement with said surface;

means for steering at least one end of said material conveying system to delineate said path whereby each framework member follows, in series, said path delineated by said at least one end as said material conveying system advances or retracts; and means for driving said orbitally moveable conveyor belt independent of the movement of said crawler chain assembly thereby allowing conveyance of material either while said material conveying system is stationary or as said material conveying system advances or retracts along said path.

2. A material conveying system as set forth in claim 1 wherein said crawler chain assembly comprises a series of said crawler chain pads interconnected by chain links to form an endless loop.

3. A material conveying system as set forth in claim 1 wherein at least one of said framework members supports said means for driving said orbitally moveable conveyor belt.

4. A material conveying system as set forth in claim 1 wherein said connector means includes means permitting universal type movement between said framework members.

5. A material conveying system as set forth in claim 2 wherein said means for driving said crawler chain assembly includes a drive sprocket capable of engaging and circumferentially driving said orbitally moveable crawler chain assembly to thereby propel said conveying system along said surface.

6. A material conveying system as set forth in claim 1 wherein adjacent framework members include cooperating means for limiting the articulation between adjacent framework members in the horizontal, vertical and longitudinal directions.

7. A self-propelled material conveying system as set forth in claim 1 wherein said means for steering said at least one end comprises steering wheels coupled to a material receiving or discharging framework member located at said at least one end of said conveying system.

8. The material conveying system of claim 1 wherein said means for supporting said crawler chain assembly for movement in an orbital path further comprises at least one upper leg extending from the longitudinal ends of each of said framework members such that the upper legs of adjacent framework members extend longitudinally adjacent to one another.

9. The material conveying system of claim 1 wherein the end of said system opposite said at least one end is positioned laterally of a material discharge conveyor and further comprising a hopper for collecting material conveyed along said orbitally moveable conveyor belt and means for transferring conveyed and collected material from said hopper to said discharge conveyor.

10. The conveying system of claim 1 wherein said crawler chain pads are spaced along said crawler chain assembly such that the spacing between consecutive pads is smaller than the longitudinal dimension of each said lower leg of said framework members.

11. The material conveying system of claim 8 wherein said crawler chain pads are spaced along said crawler chain assembly such that the spacing between consecutive pads is smaller than the longitudinal dimension of each said upper leg of said framework members.

12. A method for conveying material being discharged from a mining machine of the type capable of advancing along a mine surface into a mine face, comprising the steps of:
connecting a series of adjacent framework members to form a longitudinally extending conveyor train;
supporting an orbitally moveable conveyor belt on said framework members, said conveyor belt extending continuously substantially throughout the entire length of said conveyor train;
supporting on said framework members orbitally moveable crawler chain assembly extending continuously throughout said framework members, said crawler chain assembly including an orbitally moveable crawler chain having pads forming an upper run and also forming a lower run capable of engaging said mine surface;
advancing said conveyor train as said mining machine advances by simultaneously orbitally driving said plurality of orbitally moveable crawler chains;
maintaining said pads of said lower run continuously in engagement with said mine surface and with said framework members;
steering said conveyor train to follow the material discharge of said mining machine as said mining machine advances into said face; and
driving said orbitally moveable conveying means independently of the movement of said crawler chain assembly to thereby allow conveyance of said discharged mined material either while said conveyor system is stationary or in motion.

13. A self-propelled material conveying system capable of traversing a surface along a curvilinear path, said system comprising:
framework members arranged in tandem on said surface along a portion of said path to form an elongated longitudinally extending conveyor train and including a first plurality and a second plurality of said framework members;
connector means on each framework member cooperable with connector means on each adjacent framework member for coupling said plurality of framework members, said connector means permitting movement between adjacent framework members;
a first crawler chain assembly and a second crawler chain assembly, each said assembly including crawler chain pads;
said first plurality of framework members including first means for supporting said first crawler chain assembly continuously throughout said first plurality of framework members and for movement in an orbital path including a lower portion wherein said crawler chain pads are maintained in engagement with said surface;
said second plurality of framework members including second means for supporting said second crawler chain assembly continuously throughout said second plurality of framework members and for movement in an orbital path including a lower portion wherein said crawler chain pads are maintained in engagement with said surface;
said first and second support means each including lower legs extending from the longitudinal ends thereof such that the lower legs of adjacent framework members extend longitudinally adjacent to one another;
said first plurality and second plurality of framework members including means for supporting continuous orbitally moveable conveyor belt passing above both of said first and second orbitally moveable crawler chain assemblies, the conveying run of said orbitally moveable conveyor belt operable to convey material substantially throughout the longitudinal extent of said train;
means for simultaneously orbitally driving said first and second orbitally moveable crawler chain assemblies to thereby propel said material conveying system along said path in engagement with said surface;
means for guiding one end of said material conveying system to delineate said path whereby each framework member follows, in series, said path delineated by said one end as said material conveying system advances or retracts; and
means for driving said orbitally moveable conveyor belt independent of the movement of said crawler chain assemblies thereby allowing conveyance of material either while said material conveying system is stationary or as said material conveying system advances or retracts along said path.

14. The material conveying system of claim 13 wherein the end of said system opposite said one end is positioned laterally aside of a material discharge conveyor and further comprising a hopper for collecting material conveyed along said orbitally moveable conveyor belt and means for transferring conveyed and collected material from said hopper to said discharge conveyor.

15. The material conveying system of claim 13 wherein said crawler chain pads are spaced along said crawler chain assembly such that the spacing between consecutive pads is smaller than the longitudinal dimension of each said lower leg of said framework members.

16. The material conveying system of claim 13 wherein said first and second means for supporting said crawler chain assembly for movement in an orbital path further each comprise upper legs extending from the longitudinal ends thereof such that the upper legs on adjacent framework members extend longitudinally adjacent to one another.

17. The material conveying system of claim 16 wherein said crawler chain pads are spaced along said crawler chain assembly such that the spacing between consecutive pads is smaller than the longitudinal dimension of each said upper leg of said framework members.

* * * * *

UNITED STATES PATENT AND TRADEMARK OFFICE
CERTIFICATE OF CORRECTION

PATENT NO. : 4,865,185

DATED : September 12, 1989

INVENTOR(S) : Theodore B. Bodimer

It is certified that error appears in the above-identified patent and that said Letters Patent is hereby corrected as shown below:

Col. 10, line 59, delete [th] and substitute therefor --the--.

Col. 15, line 13, after "laterally" insert --aside--.

Col. 12, line 2, delete "alonside" and substitute therefore --alongside--.

Signed and Sealed this

Twenty-seventh Day of August, 1991

Attest:

HARRY F. MANBECK, JR.

Attesting Officer

Commissioner of Patents and Trademarks